Sept. 5, 1967  J. B. TRAINOR  3,339,668
AIR EXHAUST NOISE ATTENUATOR
Filed March 18, 1965  2 Sheets-Sheet 1
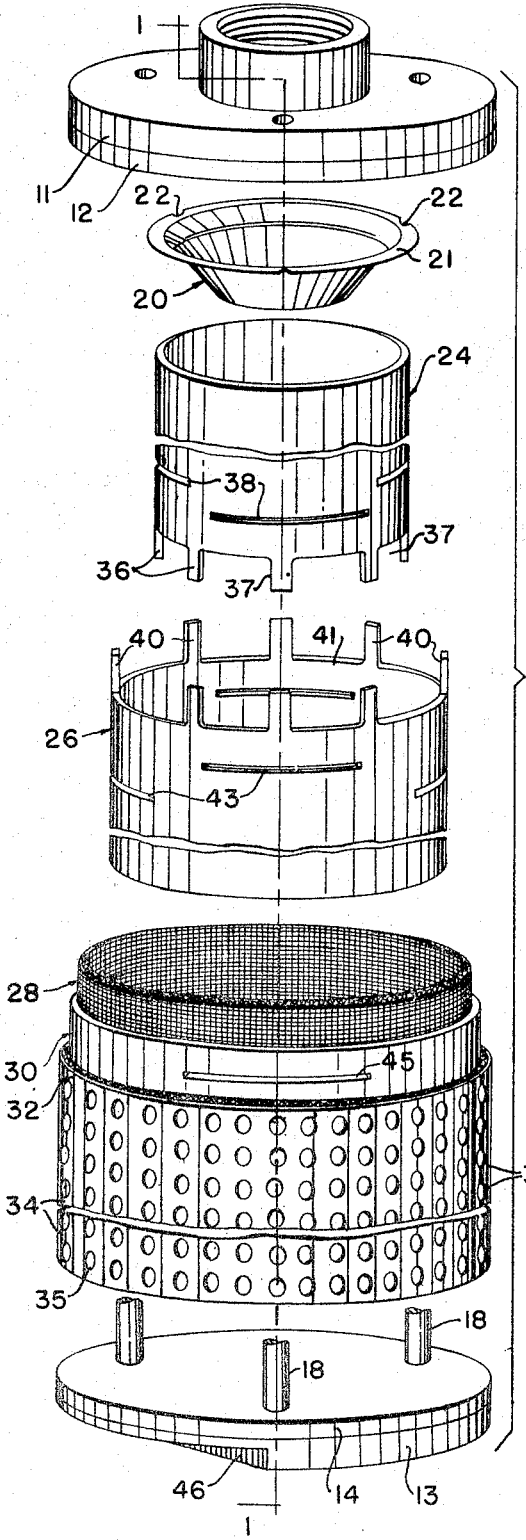
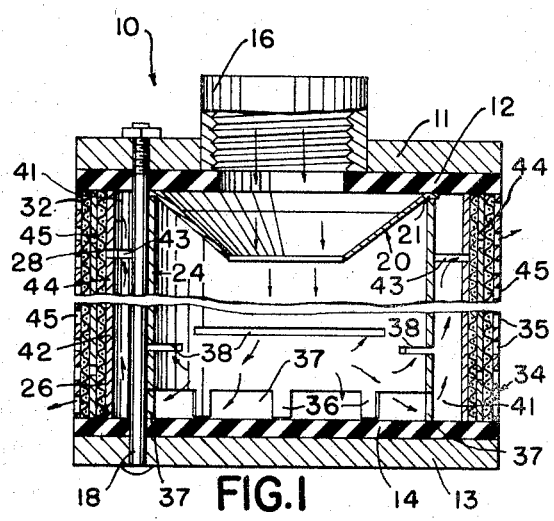
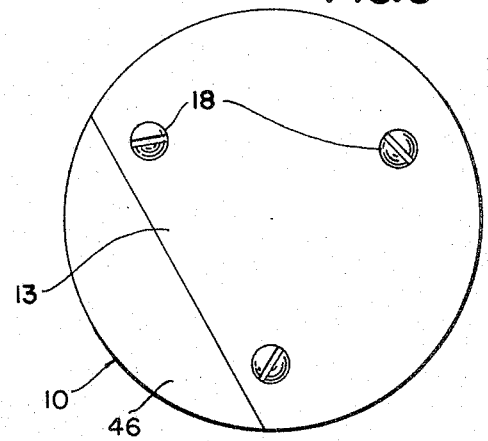
FIG. 1
FIG. 2
FIG. 3
INVENTOR.
JOHN B. TRAINOR
BY Whittemore, Hulbert &
Belknap
ATTORNEYS Sept. 5, 1967 J. B. TRAINOR 3,339,668
AIR EXHAUST NOISE ATTENUATOR
Filed March 18, 1965 2 Sheets-Sheet 2
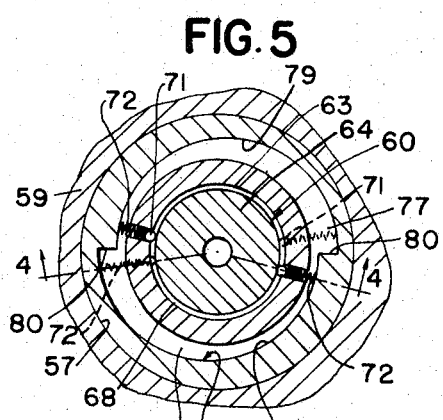
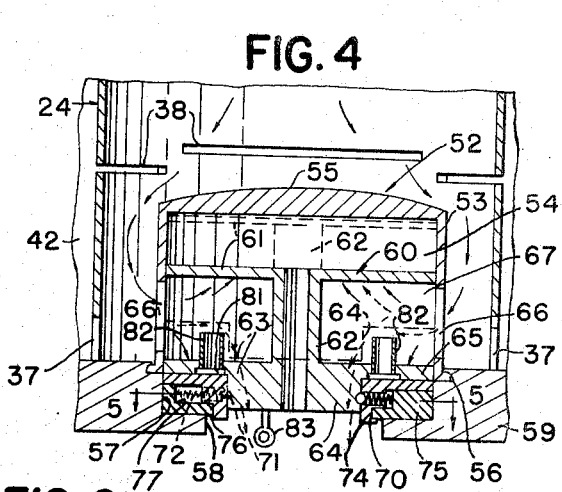
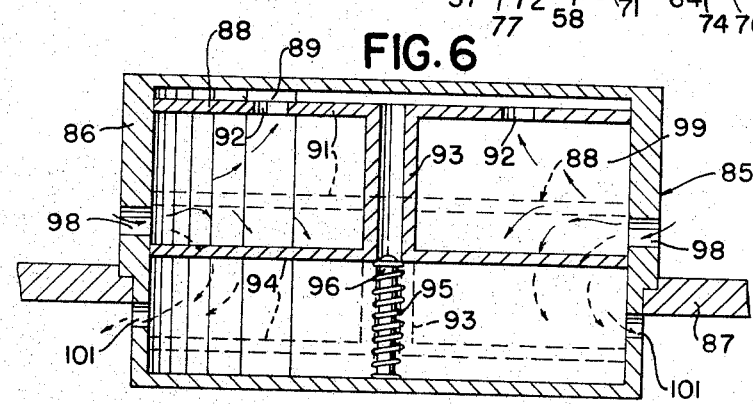
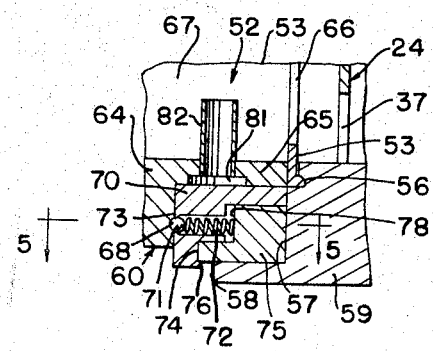
INVENTOR.
JOHN B. TRAINOR
BY Whittemore, Hulbert
Belknap
ATTORNEYS United States Patent Office 3,339,668
Patented Sept. 5, 1967

3,339,668
AIR EXHAUST NOISE ATTENUATOR
John B. Trainor, Madison Heights, Mich., assignor to C. W. Morris Company, Detroit, Mich., a corporation of Michigan
Filed Mar. 18, 1965, Ser. No. 440,693
27 Claims. (Cl. 181—37)

ABSTRACT OF THE DISCLOSURE

A sound attenuation device for use in factories and the like is shown, in which successive cylindrical and concentric, radially spaced shells of a tubular body each have a series of axially spaced and circumferentially staggered slots of narrow axial width communicating in a vertically staggered way with an axial gas flow passage between the shells.

The innermost shell affords a radial passage at one axial end thereof and the outermost shell has a multiplicity of openings to atmosphere. The intake of gas from the unit which it is sought to sound-deaden is at an opening in an end closure of the device, the gas flowing axially in the inner shell and impinging an opposite end closure. Gas also flows radially outward under pressure through said slots in the inner shell, radially impinging and substantially interrupting the gas flow in the passage with a cancelling effect. The gas ultimately flows through cylindrical mesh means to atmosphere.

---

The present invention relates to an improved air exhaust noise attenuator for use in association with pneumatically operated industrial equipment, such as electric welders, presses, air hoists, foundry and automation equipment, and the like, involving the repeated exhausting of relatively high pressure air in widely-varying pulse frequencies. Of late years, more and more attention has been paid to the effects occasioned by daily noise shock on workers in an industrial working area. It has been increasingly recognized as a hazard of mass machine production, resulting in decreased quantity or quality of work ouput due to worker fatigue and diminished concentration, increased incidence of accidents, loss of hearing, diminished employee morale, etc.

Much of the objection to presently used industrial noise muffling devices is attributable to an excessive back pressure which they necessarily place upon the exhaust phase of the pneumatic cycle, as at an exhaust control valve of the equipment. Of course, excessive back pressure on any such valve tends to slow down and diminish the efficiency of its operation. Indeed, because of the design of certain of such valves, they cannot tolerate an excessive back pressure without the likelihood of repeating, with resultant possibility of injury to an operator. Likewise, the possibility of injury to an operator. Likewise, the possibility of a bursting of the muffler unit under excessive pressure is always present. Therefore, the desirability of reducing decibles must be weighed against the possibility of introducing safety hazards and malfunctioning of the sort just mentioned. The silencing device should be compatible to the greatest possible degree with all equipment operations, coupled with an acceptable length of life and trouble-free performance.

These objectives have for a long time faced designers of known and presently used industrial pneumatic noise attenuators; and it is a basic object of the present invention to provide a silencer or muffler of greatly improved performance by reason of its various novel contributing features, which render the subject attenuator far superior in operation than those currently used, on the basis of accepted standards of public health departments, insursurance companies and industry itself.

Another object of the invention is to provide such an attenuator unit or device which is very compact in structure and may be variably fitted to a piece of pneumatic equipment in a manner not to blow a blast of air upon the attendant thereof.

More specifically, it is an object to provide an air exhaust attenuator which meets in an improved way the desired objective of balancing a high degree of noise attenuation against a low value of back pressure, as by an arrangement of concentric inner shells or sleeves which have slot-like apertures and are associated with one another to provide radially spaced, axially extending passages in which a flow and counterflow of exhaust air takes place in a sinuous or serpentine fashion, with the flow interrupted and diffused by air issuing radially outwardly through the slotted apertures of the shell or sleeve members. Thus high frequency waves traveling, respectively, in axial and radial directions, intersect and impinge one another with a resultant canceling and muffling effect. There is provided a controlled expansion of the flowing air to reduce its velocity and consequent high frequency noise.

Another object is to provide a device of the character in question, in which there are at least two of the shell or sleeve members mentioned above, these members being associated between end closures, one of which has means for attachment of the pneumatic equipment in communication with its exhaust control valve and the other of which is closed, which members have horizontally disposed and elongated slots through which the radial flow of air takes place in the manner mentioned above. This results in the provision of a desired apertured exhaust area with a minimum of aperturing, and further offers great availability for a free outward air flow without building up undue back pressure.

Still further in accordance with the invention, the slotting of one of a pair of axially telescoped and radially spaced sleeve or shell members is provided adjacent one axial end of one thereof and adjacent the opposite axial end of the other thereof. Thus, the possibility of a direct radial blasting of air from the slots of the innermost member through those of the outermost member, such as would destroy the desired diffusive effect, is eliminated.

In yet another important aspect of the invention, the control of the reversing sinuous flow of the air stream in the axial direction is also effected at opposite axial ends of the telescoped, radially spaced members, and directly at a planar zone of their engagement between axially spaced closure parts as referred to above. Thus the improved attenuator distinguishes from certain known ones in which there is an impingement of the incoming gas flow at an axial end of the device, but in a domed space of considerable volume. This introduces turbulence such as detracts from a desiredly controlled reverse of flow in the opposite axial direction.

In further accordance with the invention, the improved device is completed by an external, copiously perforated shell providing an outer casing wall of the device, through which the muffled air issues directly to atmosphere, as distinguished from automotive exhaust and like internal combustion engine mufflers in which the exhausting flow is axial from a close outer casing. Moreover, at least one of a set of telescoped and apertured shells within this perforated outer wall is associated with a layer of mesh material, preferably a wire screen wound in multiple laminae, through which the air passes in issuing from the device.

It is another object of the invention to provide, as a safety feature for the improved attenuator device, simple means, incorporated in an end closure of the device, for permitting an escape leak of excess pressure such as might, unless voided in part, give rise to a risk of bursting of the device.

Yet another object is to provide still further alternative safety features, involving the use of one or another type of differential area plunger to permit a valved voiding of back pressure in excess of a desired limit.

More particularly, it is an object to incorporate in such a differential plunger unit provisions to counteract or absorb the abnormal effect of very high initial impact pulse pressure, in a time interval of practically immeasurably small duration; so that its pressure relieving operation properly takes place within a more normal range of accumulated excess back pressure. Such accumulated back pressure may be illustratively defined as one arising due to some abnormal restriction in the flow path through the attenuator unit, for example, due to sabotage, improper painting and sealing of the passages of the outer shell of the attenuator device, or some other type of obstruction of its outlet passages.

The foregoing as well as other objects will become more apparent as this description proceeds, especially when consider in connection with the accompanying drawings illustrating the invention, wherein:

FIG. 1 is a sectional view, partially broken, of the improved device, the section being in a plane including the axis of the device, i.e., corresponding to the section line 1—1 in FIG. 2;

FIG. 2 is an exploded view of the component parts of the device, certain of which are cylindrical and broken to indicate that they may be of varying axial length, depending upon the intended capacity and rating of the device;

FIG. 3 is a fragmentary bottom plan view of the device, showing a simple suggested "fail-safe" feature built into an end closure of the device to protect against excessive pressure;

FIG. 4 is a fragmentary, somewhat enlarged scale view of a device having an alternative type of pressure limiting means involving the use of a differential pressure piston or plunger, this view being vertically sectioned along broken line 4—4 of FIG. 5 and showing in dotted line a position of the plunger under an excessive pressure;

FIG. 4A is a fragmentary view of a portion of FIG. 4 in larger scale;

FIG. 5 is a fragmentary view in horizontal section on line 5—5 of FIGS. 4 and 4A; and FIG. 6 is a fragmentary view in vertical axial section through a device incorporating another embodiment of differential pressure type of safety feature.

Referring to FIGS. 1 and 2, the improved non-automotive sound attenuator unit, generally designated by the reference numeral 10 in FIG. 1, comprises a number of concentric and axially telescoped components (hereinafter described in detail) which are received and clamped between a centrally apertured upper closure plate 11 equipped with an optional equal diameter, centrally apertured, elastically deformable gasket 12, and an imperforate bottom closure plate 13 and its optional equal diameter, elastically deformable gasket 14. Plate 11 receives an internally threaded fitting 16 appropriately sized as to diameter to fit the nipple or elbow (not shown) of a piece of pneumatically operated industrial equipment of any type instanced above. As thus fitted to the pneumatic instrumentality, the device 10 may be disposed in any desired position relative to the equipment it silences.

Elongated studs or through bolts 18, indicated as being three in number and equally spaced circumferentially, are typical of means for clamping the intermediate telescoped components between the top and bottom closure structures 11, 12 and 13, 14, respectively. It is apparent from what is said above that the terms "top" and "bottom" are employed arbitrarily only, in view of the fact that the unit 10 may be positioned in space as desired.

The concentric, coaxially telescoped components of the invention, most of which are cylindrical in character, are best shown exploded in FIG. 2 of the drawings, reference of course being also had to FIG. 1.

In progression from top to bottom of FIG. 2, these parts are a frusto-conical, annular directing or focusing funnel 20 having an upper, horizontally projecting flange 21 provided at equal circumferential spacing with small recesses or bays 22 to mate with the clamping studs 18 and thus center funnel 20 in place; a first or inner cylindrical shell or sleeve 24 whose outer diameter is such that it may be piloted by engagement with the three studs 18, the flange 21 of funnel 20 resting atop the shell 24 (whose further features will be described); a second cylindrical shell or sleeve 26 of substantially greater diameter yet generally similar in its features (also to be described in detail) to the shell 24, but in an inverted positioning relative to the latter; a first layer 28 of multiple laminate mesh screen in a diameter substantially greater than the shell or sleeve 26; a third sleeve or shell 30 whose internal diameter is such that the screen layer may be slidably inserted in the latter in direct contact therewith; a second similar laminated layer 32 of mesh screen into which the shell 30 may be telescoped in direct contact; and a final, outer shell or sleeve 34 of relatively slight thickness which is perforated extensively at 35, constituting the outer wall of the device 10, into which the components 28, 30 and 32 may be snugly telescoped.

The cylindrical components just described may be fabricated of metal or an appropriate plastic in a gage or thickness adequate to withstand radial pressures involved in the use of the device 10, which may, for example, be of the order of 90–100 p.s.i. All of these cylindrical components 24, 26, 28, 30 and 34 are of the same height, so as to be contacted from above and below in the assembly of the unit or device 10 shown in FIG. 1.

The first or inner muffling shell 24 controls the initial change or direction of axial flow of exhaust air, as directed from fitting 16 through the focusing cone or funnel 20 onto the bottom gasket 14. To this end, the shell 24 is provided at its bottom extremity with a plurality of equally spaced upright legs 36 of substantial height which bottom on gasket 14; and at sufficient intervals to provide air flow passages 37 of substantial area. Directly above legs 36 the shell or sleeve 24 is formed to provide a number of horizontally elongated slots 38, for example four in number, which are arranged in two parallel tiers at different levels, being staggered in the circumferential sense relative to one another. As indicated above, the slots 38 are positioned adjacent the bottom of sleeve 24, and may be in more than two rows or tiers, depending upon the axial dimension and intended capacity of device 10.

It is in order to point out here that the features of shape, size and spacing of the slots 38 relative to one another and to the bottom openings 37 between legs 36 of shell 24 are factors of considerable significance in the success of operation of the improved sound attenuator, as will be hereinafter pointed out.

The second cylindrical sleeve or shell 26 is, as indicated above, similar to the shell 24, but of substantially larger diameter and inverted relative thereto. Thus, shell 26 has integral upward extensions 40 equally spaced thereabout and separating radial openings or passages 41 at the upper end of shell 26, the extensions 40 being engaged from above by the top gasket 12. As shown in FIG. 1, the shell 26 is sufficiently greater in diameter than its inner counterpart 24 to afford a cylindrical and axially elongated air flow passage 42 between these members. Shell 26 is provided with its own plurality of horizontally elongated radially flow slots 43, similar in number and their staggered spacing in tiers to those of the shell 24. Like the slots 38, the slots 43 of each tier are quite widely spaced at their ends from one another (illustratively 180°); and the tiers are confined to the region of shell 26 adjacent its extensions 40 for a reason to appear.

The third outermost shell 30 is continuous about its top and bottom margins, and is provided with a plurality of horizontally elongated slots 45. Unlike the slots 38 and 43, the slots 45, although shown in tiers of two each at 180° to one another, extend in such equally spaced tiers or zones throughout the vertical dimension of sleeve 30. Each diametrically opposed pair of slots 45 is shifted 90° relative to the preceding and/or succeeding tier, as in the case of slots 38 and 43.

The outer wall shell 34 is profusely provided with a multiplicity of the circular apertures 35 through which the muffled air ultimately exits to atmosphere; and the inner and outer cylindrical, multiple laminae screens 28, 32 of wire mesh fit snugly but slidably relative to the shell 30 and outer wall 34, as mentioned above.

In the use of the unit 10, the entering exhaust air, as directed or focused by the conical funnel 20, first downwardly impinges the bottom closure, shown as including the imperforate bottom gasket 14, from which it mushrooms laterally through the spaces 37 between legs 36 of inner shell 24. It is to be understood, of course, that some embodiments of the device may omit gaskets 12 and 14. This lateral flow puts the air in upward flow in the annular passage or chamber 42 (FIG. 1), dissipating impact energy of the entering gas. At the same time, upwardly and laterally deflected air passes through the horizontal tiers of radially elongated slots 38, in the form of high frequency and velocity jets, which impinge and intersect the high frequency and velocity air flow upwardly in passage 42, with a resultant interruptive and canceling diffusive effect.

Passing further upwardly in the annular space or chamber 42, the gas flow again takes a dual exit above, i.e., radially through the tiers of horizontally elongated slots 43 of the second shell 26, as well as upwardly over and radially through the openings 41 between top extensions of the latter, thence downwardly along a second axial flow passage 44 between the sleeve or shell 26 and the first or inner layer of screen mesh 28. There results a still further diffusion and dissipation of the frequency and velocity of the reversed, downward flowing stream.

Next, in flowing through the axial passage or chamber 44, the air progressively exits through screen layer 28 and the series of horizontal slots 45 of the third shell 30, thence through the outer screen component 32 and perforated outer wall 34, with an attendant final diffusive effect.

In regard to the locating of the various sets of slots 38, 43 and 45 at different vertical or axial levels, as shown in FIG. 1, this prevents the direct blast-through of air from one shell through another with destructive effect on the desired diffusive action on the axial flowing air streams. By the same token, the location of the extreme radial end openings 37 and 41 of the two inner shells 24 and 26, respectively, controls and confines the place of change of flow direction to a flat zone directly at the end of the shell in question. Undesired flow turbulence at this time, such as might take place in a more extended or domed axial space, is avoided.

In reference to the relatively thin and laterally elongated nature of the slots 38, 43 and 45, tests have shown that, as compared with an equal total area of opening produced by perforation, for example as in the case of outer wall 34, the contemplated horizontal slotting results in a fraction of the back pressure, all other factors being the same. Likewise in reference to the shape and arrangement of the slots in question, it is evident by reference to FIGS. 1 and 2 that the fact that their ends, in successive tiers, are relatively closely adjacent one another provides maximum availability for free entry and passage of air to the respective annular axial flow passages 42 and 44.

Moreover, manufacturing is facilitated, since the slots in question are quickly and readily produced by ganged milling cutters. The length of the slots may by the same token be readily controlled in production to control back pressure build-up, on the principle that the total outlet slot area at different shells should be appropriately related to the total inlet area.

Tests have demonstrated that, in comparison with existing air attenuator devices of the same capacity, but effective to reduce the sound level to, say, 109 decibels, the device 10 of the invention will drop the level to 97 decibels. The apparently small differential is nevertheless very significant when it is recognized that decibels are related to energy in a logarithmic progression, and that the ratio of the acoustic power (sound energy) level of the device 10 to that with which it was compared represents a ratio of 1:16.

The highly desirable, reductive balancing of back pressure and noise level factors made possible by the unit 10 is particularly significant in recently developed and exacting applications of the device to equipment operating at extremely high air pulse frequency, for instance in a pneumatically operated spot welder whose control valve operates as many as six times per second. At such frequencies and under an unduly high back pressure, the valve may become inoperative or, worse, in a stamping operation the press could repeat with a hazardous effect; but the improved device has been found reliably capable of handling an installation of this nature.

As indicated above, the invention in any event contemplates the provision of various optional types of safety means for the limiting of excessive pressures within the attenuator, such as might possibly, unless controlled, lead to rupture or bursting, over and above the undesirable back pressure effects just mentioned.

Thus, reference being had to FIG. 3, showing one proposed very simple type of "fail-safe" feature, it is contemplated that the bottom closure plate 13 may be lessened in thickness at one or more chordal zones 46 outwardly of the clamping studs 18. This diminution of thickness and rigidity of the plate in local outer places is such that in the event of an excessive high pressure the plate will thereby flex almost imperceptibly, but sufficiently to permit leakage and voiding of the pressure excess between the gasketed plate 13 and the bottoms of the respective shells, layers or walls 26, 28, 30, 32 and 34.

A still further possible provision to limit excessive pressures involves the use of a differential piston type pressure plunger or supplemental safety unit, two proposed adaptations of which are respectively shown in FIGS. 4, 4A and 5 and FIG. 6.

Referring to the form of FIGS. 4, 4A and 5, the assumption will be made that the attenuator device to which this pressure limiting unit, designated 52, is applied is in all other respects comparable to the device 10, including an inner shell 24 having radial bottom passages 37 and horizontally elongated slots 38. Safety or protective unit 52 comprises an inverted cup member 53 defining a cylinder space 54 closed at its upper end by an integral top 55. The wall of the member 53 is appropriately fitted, as by an integral bottom snap rim 56 or equivalent means, directly within a counterbore 57 of an open cylindrical bore 58 of the bottom plate, here designated 59, of the attenuator in question.

A differential plunger 60 is fitted in the cylinder 54 with sliding tolerance, the plunger 60 including a radially extending annular top flange 61 surrounding a tubular axial stem 62. This stem integrally joins bottom flange 63 of plunger 60, which flange is centrally thickened at 64, as compared with the thinner outer annular flange portion 65. The wall of cylinder member 53 is laterally apertured in substantial size at 66 for the inflow of the exhaust air into a relatively large annular space or chamber 67 between the plunger flanges 61 and 63.

The central cylindrical portion 64 of bottom flange 63 which is of substantial axial thickness is formed to provide an annular detent groove 68 surrounding the same, as best shown in FIG. 4A; and a ball detent ring 70 having an axial flange of uniform stepped contour in section surrounds flange portion 64 and groove 68, one step of an axially extending flange of ring 70 is drilled radially at diametrically opposed points to receive a pair of detent balls 71 mating with the groove 68, along with a coil compression spring 72 to urge each ball against the groove. Conventionally, the balls are restrained in their radial bores by an annular lip 73 of the latter. The spring biased ball and spring provisions coact in the operation of unit 52 to limit excess pressure, in a manner to be later described.

Provisions are also made to adjust the spring bias on the detent balls 72; and to this end the lower end of the cylindrical axial flange of ring 70 pilots in a central cylindrical opening 74 of an eccentric or cam-walled ring 75. The outer periphery of ring 75 is cylindrical to fit within the cylindrical counterbore 57 of bottom plate 59; and nibs 76 may be provided on the periphery of detent ring 70 to restrain the same axially relative to eccentric ring 75, as piloted in the bore or opening 74 of the latter. Ring 75 presents a radially inwardly extending, horizontal flange surface 77, the irregular external wall shape of which is best depicted in FIG. 5.

As therein illustrated, the wall, generally designated 78, which outlines flange surface 77 is suitably machined in an eccentric or cam-shaped outline which duplicates itself at like, diametrically opposed cam portions, designated 79. Each of these progressively increases, in semi-helix form, from a restricted diameter to a maximum diameter, at which it connects inwardly at a radius 80 with the radially restricted portion of the opposite cam or eccentric portion 79 of like contour.

The ball-biasing springs 72 bear outwardly against the respective wall cam portions 79, so that a given rotative adjustment of the ball detent ring 70, for example, clockwise in FIG. 5, will bring the balls 71 from the solid line, maximum-compressed position of FIG. 5 toward or to the minimum-compressed position shown in dotted line in FIG. 5.

Again referring to FIGS. 4 and 4A, the bottom of the plunger outer flange portion 65 rests directly upon an upper horizontal flange portion of the ball detent ring 70, in sealing engagement therewith, and is recessed at 81 in an annular zone about stem 62 directly above and within the radial limits of this horizontal flange. One or more upright dust blocking tubes 82 of small bore size communicate the recess 81 with the chamber 67 between flanges 61 and 63 of the plunger 60.

In operation, assuming that the attenuator device is operating under the normal line pressure of, say, 90–100 p.s.i., the plunger 60 will remain seated upon the ball detent ring 70, with the annular recess 81 of bottom plunger flange 65 sealed by that ring. With the plunger releasably held in this position by the spring biased detent balls 71, the pressure in the chamber 67 acts with respectively greater and lesser forces (as depicted by the solid line arrows of FIG. 4) on the upper and lower plunger flanges 61 and 63, the force differential being in proportion to the area of the annular recess 81 of the latter; but so long as the pressure does not exceed a predetermined value (adjustable by varying the compression of ball springs 72 by rotating eccentric ring 75), the balls 71 are engaged fully in the annular groove and plunger 60 remains in the solid line position of FIGS. 4 and 4A.

However, upon the arising of an excessive pulse pressure, sufficient that the differential upward force on flange 61 is able to elevate plunger 60 against the detent action of balls 71, then the plunger rises for the time duration of the excess pressure in chamber 67, over as many pulses as may be involved, to the dotted line position of FIG. 4.

In this position of plunger 60, an open and more or less direct path is exposed for the flow of air through the side openings 66 of cylinder member 53, thence inwardly and downwardly about the enlargement 64 of plunger flange 63 and out through closure plate bore 58 to atmosphere. This condition obtains until the pressure in chamber 67 drops to a value at or below an acceptable one. The plunger 60 is then manually reset downwardly to the initial, solid line position of FIG. 4, as by manipulation of a pull element 83 on the plunger enlargement 64. As will be appreciated by those skilled in the art, any necessary or desirable provisions to seal plunger 60 in its up and down movements in cylinder space 54 are contemplated, whether of an O-ring type, a sealing cup type or the like.

The action of the pressure relief unit 52 of FIGS. 4, 4A and 5 is such as takes place in the operation of its attenuator device under what may be termed the effects of accumulated excessive back pressure in the operation of the latter, such as due to intentional sabotage or restriction of normal air flow through the outer shell 34 of the device. However, the provision of the openings or orifices 82 at the recess 81 of plunger flange 63 serves another important function.

That is, in each operation the exhaust air entering device 10 may, depending upon its proximity to the valve of the silenced mechanism (not shown), for the very smallest and almost measurable time interval impact the unit 52 at a pressure amounting to nearly the full line pressure flowing into the attenuator device, then drop immediately to what has been referred to above as a normal accumulated back pressure only. However, the restrictive effect of the small-sized apertures in flange 63 prevents the initial, almost infinitesmally short impact pressure from actuating the relief unit which is, as stated above, intended to respond only to accumulated excessive back pressure.

Until the air becomes fully effective in recess 81 the relief unit remains in balance in the solid line position of FIG. 4, becoming unbalanced and shifted to the dotted line position depending on the force exerted by the ball detent provisions, the number and size of openings to the plunger differential area, and the like.

A relatively simpler embodiment of the differential plunger type pressure relief structure is shown in FIG. 6, being generally designated by the reference numeral 85. In this case a cylindrical casing 86, closed at its top and bottom, is fixedly fitted within an opening in the bottom closure 87 of the noise attenuator device, which will, again, be assumed to be the same as that illustrated in FIGS. 1–3. A plunger 88 is slidable with working clearance in the cylinder space 89 of casing 85, again with any necessary provisions (not shown) for an effective pressure seal.

Plunger 88 comprises a circular top flange 91 provided with a plurality of circumferentially spaced openings 92; an integral tubular stem 93; and a circular bottom flange 94 integrally joined by the central stem 93. Plunger 88 is resiliently urged upwardly by means of a coil compression spring 95 piloted upon an upright center pin 96 which is receivable with side clearance in the bore of stem 93, the spring bottoming on the bottom closure element of casing 85 and acting upwardly upon flange 94.

The wall 86 of casing 85 is provided with a plurality of radial ports 98 of substantial size, through which the air impulse pressure enters the annular space or chamber 99 between plunger flanges 91 and 94. Likewise, the chamber is provided with further, circumferentially spaced, radial exhaust ports 101 directly beneath the plate 87.

Under acceptable conditions of pulse pressure, the plunger 88 is normally urged upwardly by spring 95 to the solid line position shown in FIG. 6. Air entering the intake ports 98 is effective upwardly and downwardly, respectively, upon the plunger flanges 91 and 94, a greater force being exerted on the latter, of course, in a ratio corresponding to the area of the openings 92 in plunger 91; and the last named flange is subjected to equal force from above and below.

When the pulse pressure reaches a value sufficient that the downward force on the bottom flange 94 overcomes the force of spring 95, plunger 88 descends sufficiently to bring its bottom flange to the dotted line position of FIG. 6, beneath the exhaust ports 101, and the flow of gas is then as illustrated by the dotted line arrows of FIG. 6, i.e., in through ports 98, through plunger chamber 99 and out through exhaust ports 101. With the excess pressure thus voided to a value beneath the critical, spring 95 returns plunger 88 to the normal solid line position of FIG. 6.

It is seen that the differential pressure embodiment of FIG. 6 is considerably simpler and less expensive of production than that of FIGS. 4, 4A and 5, but lacking in adjustability other than through a choice of the strength of spring 95. It is, however, automatically self-setting.

Reference has been made to the fact that the unit 10 and/or its pressure relief structure may be fabricated otherwise than by metal working procedures to provide the various structural forms of its components referred to above, as by thermoplastic or thermosetting molding procedure. It will also be evident to those skilled in the art that this may well entail or result in certain minor changes of form, for example, in the integral uniting of the legs 36 and extensions 40 of the respective shells 24 and 26 adjacent an axial end thereof. Similarly, it may be found desirable to locate the respective tiers of slots 38 and 43 in an area or areas of the shells other than adjacent an axial end thereof, although this arrangement appears to have advantages. All such permissive alterations are contemplated as being within the scope of the appended claims, unless specifically so limited.

What I claim as my invention is:

1. A sound attenuation device comprising a tubular plural shell type muffler structure having an apertured closure at one axial end thereof at which said device may be communicated with a gas pressurized unit to receive gas to be muffled from the latter, and another closure at the opposite axial end of said structure against which the gas may impinge in flow from said unit, said structure comprising apertured, telescoped and radially spaced tubular shells defining an axially extending gas flow passage therebetween, at least the innermost of said shells having circumferentially elongated slots of relatively slight axial width formed therein in a spaced circumferential relationship of the slots to one another, through which slots the gas may pass radially outwardly of said innermost shell to said flow passage, corresponding shell ends providing radial openings of substantial axial and circumferential extent adjacent one of said closures, through which openings the gas may flow outwardly for an axial flow through said first named passage between said shells.

2. A sound attenuation device comprising a tubular, plural shell type muffler structure having an apertured closure at one axial end thereof at which said device may be communicated with a gas pressurized unit to receive gas to be muffled from the latter through the aperture of said closure under substantial pressure, and another closure at the opposite axial end of said structure against which the gas may impinge in flow from said unit, said structure comprising first and second apertured, telescoped and radially spaced tubular shells surrounding said closure aperture, said shells being oriented oppositely of one another in the axial sense and defining an axially extending gas flow passage therebetween, said shells each defining a radial passage between and end thereof and a closure and having circumferentially elongated slots of relatively slight axial width formed therein axially inwardly of an end thereof in a spaced circumferential relationship of the slots to one another, through which slots of the innermost shell the gas may pass radially outwardly to said first named flow passage, the slots of said respective shells being located adjacent one axial end thereof, the slots of the innermost shell being of limited area and directing a radial flow of gas under pressure outwardly in said limited area thereof to impinge the axial gas flow in the first named passage with an interrupting and substantially cancelling effect.

3. A sound attenuation device comprising a tubular, plural shell type muffler structure having an apertured closure at one axial end thereof at which said device may be communicated with a gas pressurized unit to receive gas to be muffled from the latter through the aperture of said closure under substantial pressure, and another closure at the opposite axial end of said structure against which the gas may impinge in flow from said unit, said structure comprising first and second apertured, telescoped and radially spaced tubular shells surrounding said closure aperture, said shells being oriented oppositely of one another in the axial sense and defining an axially extending gas flow passage therebetween, said shells each defining a radial passage between an end thereof and a closure and having axially spaced tiers of circumferentially elongated slots of relatively slight axial width formed therein axially inwardly of an end thereof in a relatively widely spaced circumferential relationship of the slots of the respective tiers to one another, through which slots of the innermost shell the gas may pass radially outwardly to said first named flow passage, the slots of said respective shells being located adjacent one axial end thereof and the slots of successive tiers being circumferentially staggered, the slots of the innermost shell being of limited area and directing a radial flow of gas under pressure outwardly in said limited area thereof to impinge the axial gas flow in the first named passage with an interrupting and substantially cancelling effect.

4. A sound attenuation device comprising a tubular plural shell type muffler structure having an apertured closure at one axial end thereof at which said device may be communicated with a gas pressurized unit to receive gas to be muffled from the latter, and another closure at the opposite axial end of said structure against which the gas may impinge in flow from said unit, said structure comprising first and second apertured, telescoped and radially spaced tubular shells oriented oppositely of one another in the axial sense and defining an axially extending gas flow passage therebetween, said shells each having circumferentially elongated slots of relatively slight axial width formed therein in a spaced circumferential relationship of the slots to one another, through which slots the gas may pass radially outwardly of the first shell to said flow passage, the slots of said shells being located in an area of the respective shells adjacent one axial end thereof, the respective opposite corresponding shell ends being formed to provide circumferentially spaced axial extensions engaged with one of said closures and defining radial openings of substantial axial and circumferential extent at the respective closures, through which openings the gas may flow outwardly for an axial flow through said first named passage between said shells, the slots of the shells being of limited area and shells directing a radial flow of gas outwardly of the latter in said limited area thereof.

5. A sound attenuation device comprising a tubular plural shell type muffler structure having an apertured closure at one axial end thereof at which said device may be communicated with a gas pressurized unit to receive gas to be muffled from the latter, and another closure at the opposite axial end of said structure against which the gas may impinge in flow from said unit, said structure comprising first and second apertured, telescoped and radially spaced tubular shells oriented oppositely of one another in the axial sense and defining an axially extending gas flow passage therebetween, said shells each having axially spaced tiers of circumferentially elongated slots of relatively slight axial width formed therein in a relatively widely spaced circumferential relationship of the slots of the respective tiers to one another, through which slots the gas may pass radially outwardly of the first shell to said flow passage, the slots of said shells being located in an area of the respective shells adjacent one axial end thereof and the slots of successive tiers being circumferentially staggered, the respective opposite shell ends being formed to provide circumferentially spaced axial extensions engaged with one of said closures and defining radial openings of substantial axial and circumferential extent at the respective closures, through which openings the gas may flow outwardly for an axial flow through said first named passage between said shells, the slots of the shells being of limited area and directing a radial flow of gas outwardly of the latter in said limited area therof.

6. A sound attenuation device comprising a tubular, plural shell type muffler structure having an apertured closure at one axial end thereof at which said device may be communicated with a gas pressurized unit to receive gas to be muffled from the latter, and another closure at the opposite axial end of said structure against which the gas may impinge in flow from said unit, said structure being fixedly clamped at its own opposite axial ends between said closures and comprising first and second concentrically telescoped and radially spaced tubular shells oriented oppositely of one another in the axial sense and defining an annular, axially extending gas flow passage therebetween, said shells each having circumferentially elongated slots of relatively slight axial width formed therein, through which slots the gas may pass radially outwardly of the first shell to said flow passage, the slots being located in an area of each shell adjacent one axial end thereof and the respective opposite shell ends being formed to provide radial openings of substantial axial and circumferential extent adjacent the respective closures, through which openings the gas may flow outwardly for an axial flow through said first named passage between said shells, the slots of the shells being of limited area and directing a radial flow of gas outwardly of said shell in said limited area thereof, a further shell surrounding said second shell, at least one tubular layer of screen material surrounding said further shell in radially spaced relation thereto, and an outermost, profusely perforated shell surrounding said screen layer in direct engagement with the latter and constituting an outer wall of said device.

7. A sound attenuation device comprising a tubular, plural shell type muffler structure having an apertured closure at one axial end thereof at which said device may be communicated with a gas pressurized unit to receive gas to be muffled from the latter, and another closure at the opposite axial end of said structure against which the gas may impinge in flow from said unit, said structure being fixedly clamped at its own opposite axial ends between said closures and comprising first and second concentrically telescoped and radially spaced tubular shells oriented oppositely of one another in the axial sense and defining an annular, axially extending gas flow passage therebetween, said shells each having axially spaced tiers of circumferentially elongated slots of relatively slight axial width formed therein in a relatively widely spaced circumferential relationship of the slots of the respective tiers to one another, through which slots the gas may pass radially outwardly of the first shell to said flow passage, successive tiers being circumferentially staggered and the slots being located in an area of each shell adjacent one axial end thereof and the respective opposite shell ends being formed to provide radial openings of substantial axial and circumferential extent adjacent the respective closures, through which openings the gas may flow outwardly for an axial flow through said first named passage between said shells, the slots of the shells being of limited area and directing a radial flow of gas outwardly of said shell in said limited area thereof, a further shell surrounding said second shell, at least one tubular layer of screen material surrounding said further shell in radially spaced relation thereto, and an outermost, profusely perforated shell surrounding said screen layer in direct engagement with the latter and constituting an outer wall of said device.

8. A sound attenuation device comprising a tubular, plural shell type muffler structure having an apertured closure at one axial end thereof at which said device may be communicated with a gas pressurized unit to receive gas to be muffled from the latter, and another closure at the opposite axial end of said structure against which the gas may impinge in flow from said unit, said structure being fixedly clamped at its own opposite axial ends between said closures and comprising first and second concentrically telescoped and radially spaced tubular shells oriented oppositely of one another in the axial sense and defining an annular, axially extending gas flow passage therebetween said shells each having circumferentially elongated slots of relatively slight axial width formed therein, through which slots the gas may pass radially outwardly of the first shell to said flow passage, the slots being located in an area of each shell adjacent one axial end thereof and the respective opposite shell ends being formed to provide circumferentially spaced axial extensions engaged with one of said closures and defining radial openings of substantial axial and circumferential extent at the respective closures, through which openings the gas may flow outwardly for an axial flow through said first named passage between said shells, the slots of the shells being of limited area and directing a radial flow of gas outwardly of said shell in said limited area thereof, a further shell surrounding said second shell, at least one tubular layer of screen material surrounding said further shell in radially spaced relation thereto, and an outermost, profusely perforated shell surrounding said screen layer in direct engagement with the latter and constituting an outer wall of said device.

9. A sound attenuation device comprising a tubular, plural shell type muffler structure having an apertured closure at one axial end thereof at which said device may be communicated with a gas pressurized unit to receive gas to be muffled from the latter, and another closure at the opposite axial end of said structure against which the gas may impinge in flow from said unit, said structure being fixedly clamped at its own opposite axial ends between said closures and comprising first and second concentrically telescoped and radially spaced tubular shells oriented oppositely of one another in the axial sense and defining an annular, axially extending gas flow passage therebetween, said shells each having axially spaced tiers of circumferentially elongated slots of relatively slight axial width formed therein in a relatively widely spaced circumferential relationship of the slots of the respective tiers to one another, through which slots the gas may pass radially outwardly of the first shell to said flow passage, successive tiers being circumferentially staggered and the slots being located in an area of each shell adjacent one axial end thereof and the respective opposite shell ends being formed to provide circumferentially spaced axial extensions engaged with one of said closures and defining radial openings of substantial axial and circumferential extent at the respective closures, through which openings the gas may flow outwardly for an axial flow through said first named passage between said shells, the slots of the shells being of limited area and directing a radial flow of gas outwardly of said shell in said limited area thereof, a further shell surrounding said second shell, at least one tubular layer of screen material surrounding said further shell in radially spaced relation thereto, and an outermost, profusely perforated shell surrounding said screen layer in direct engagement with the latter and constituting an outer wall of said device.

10. A sound attenuation device comprising a tubular, plural shell type muffler structure having an apertured closure at one axial end thereof at which said device may be communicated with a gas pressurized unit to receive gas to be muffled from the latter, and another closure at the opposite axial end of said structure against which the gas may impinge in flow from said unit, said structure being fixedly clamped at its own opposite axial ends between said closures and comprising first and second concentrically telescoped and radially spaced tubular shells oriented oppositely of one another in the axial sense and defining an annular, axially extending gas flow passage therebetween, said shells each having circumferentially elongated slots of relatively slight axial width formed therein, through which slots the gas may pass radially outwardly of the first shell to said flow passage, the slots being located in an area of each shell adjacent one axial end thereof and the respective opposite shell ends being formed to provide radial openings of substantial axial and circumferential extent adjacent the respective closures, through which openings the gas may flow outwardly for an axial flow through said first named passage between said shells, the slots of the shells being of limited area and directing a radial flow of gas outwardly of said shell in said limited area thereof, a further shell surrounding said second shell in radially spaced relation to the matter to provide a second annular, axially extending flow passage between said second and further shells, at least one tubular layer of screen material surrounding said further shell in radially spaced relation thereto, and an outermost, profusely perforated shell surrounding said screen layer in direct engagement with the latter and constituting an outer wall of said device.

11. A sound attenuation device comprising a tubular, plural shell type muffler structure having an apertured closure at one axial end thereof at which said device may be communicated with a gas pressurized unit to receive gas to be muffled from the latter, and another closure at the opposite axial end of said structure against which the gas may impinge in flow from said unit, said structure being fixedly clamped at its own opposite axial ends between said closures and comprising first and second concentrically telescoped and radially spaced tubular shells oriented oppositely of one another in the axial sense and defining an annular, axially extending gas flow passage therebetween, said shells each having axially spaced tiers of circumferentially elongated slots of relatively slight axial width formed therein in a relatively widely spaced circumferential relationship of the slots of the respective tiers to one another, through which slots the gas may pass radially outwardly of the first shell to said flow passage, successive tiers being circumferentially staggered and the slots being located in an area of each shell adjacent one axial end thereof and the respective opposite shell ends being formed to provide circumferentially spaced axial extensions engaged with one of said closures and defining radial openings of substantial axial and circumferential extent at the respective closures, through which openings the gas may flow outwardly for an axial flow through said first named passage between said shells, the slots of the shells being of limited area and directing a radial flow of gas outwardly of said shell in said limited area thereof, a further shell surrounding said second shell in radially spaced relation to the matter to provide a second annular, axially extending flow passage between said second and further shells, at least one tubular layer of screen material surrounding said further shell in radially spaced relation thereto, and an outermost, profusely perforated shell surrounding said screen layer in direct engagement with the latter and constituting an outer wall of said device.

12. A sound attenuation device in accordance with claim 1, and further comprising a frusto-conical member aligned with the aperture of said first closure and converging toward said other closure to direct the flow of gas in impinging the latter.

13. A sound attenuation device in accordance with claim 5, and further comprising a frusto-conical member aligned with the aperture of said first closure and converging toward said other closure to direct the flow of gas in impinging the latter.

14. A sound attenuating device in accordance with claim 1, in which one of said closures is reduced in axial thickness adjacent the perimeter thereof to permit gas under excessive pressure to escape radially outwardly of the device between said shell structure and said one closure.

15. A sound attenuating device in accordance with claim 6, in which one of said closures is reduced in axial thickness adjacent the perimeter thereof to permit gas under excessive pressure to escape radially outwardly of the device between said shell structure and said one closure.

16. A sound attenuating device in accordance with claim 9, in which one of said closures is reduced in axial thickness adjacent the perimeter thereof to permit gas under excessive pressure to escape radially outwardly of the device between said structure and said one closure.

17. In a sound attenuation device, a tubular muffler structure comprising a pair of apertured, axially telescoped and radially spaced tubular shells defining an axially extending gas flow passage therebetween, at least the innermost of said shells having openings formed therein, through which openings the gas may pass radially outwardly of said innermost shell to said flow passage, and a pressure relief unit within said innermost shell to safeguard said device against excessive pressure, said unit comprising a cylinder member in the last named shell, a differential pressure plunger in said cylinder member having axially spaced flanges in sliding engagement with the wall of said cylinder member, said wall having an opening communicating the space between said flanges with the space within said innermost shell, said unit having a further opening controlled by said plunger and exposed to said last named space in one position of the plunger to void excess pressure from said last named space through said further opening.

18. In a sound attenuation device, a tubular muffler structure comprising a pair of apertured, axially telescoped and radially spaced tubular shells defining an axially extending gas flow passage therebetween, at least the innermost of said shells having circumferentially elongated slots of relatively slight axial width formed therein in a spaced circumferential relationship of the slots to one another, through which slots the gas may pass radially outwardly of said innermost shell to said flow passage, and closure members at opposite axial ends of said structure, one of said members being apertured radially of the innermost shell to receive a flow of gas under pressure from a unit to be muffled, said last-named gas flow axially impinging the other closure member, said gas also flowing radially outward under pressure through said slots to impinge and substantially interrupt an axial gas flow in said passage with a cancelling effect, said innermost shell defining a radial passage between an end thereof and a closure member through which gas flow may also take place.

19. In a sound attenuation device, a tubular muffler structure comprising a pair of apertured, axially telescoped and radially spaced tubular shells defining an axially extending gas flow passage therebetween, at least the innermost of said shells having circumferentially elongated slots of relatively slight axial width formed therein in a spaced circumferential relationship of the slots to one another, through which slots the gas may pass radially outwardly of said innermost shell to said flow passage, and a pressure relief unit within said innermost shell to safeguard said device against excessive pressure, said unit comprising a cylinder member in the last named shell, a differential pressure plunger in said cylinder member having axially spaced flanges in sliding engagement with the wall of said cylinder member, said wall having an opening communicating the space between said flanges with the space within said innermost shell, said unit having a further opening controlled by said plunger and exposed to said last named space in one position of the plunger to void excess pressure from said last named space through said further opening.

20. A device in accordance with claim 17, in which said plunger has detent means releasably holding the same against movement to said pressure voiding position.

21. A device in accordance with claim 17, in which said plunger has spring means resiliently biasing the same in a direction to oppose movement to said pressure voiding position.

22. A device in accordance with claim 19, in which said plunger has detent means releasably holding the same against movement to said pressure voiding position.

23. A device in accordance with claim 19, in which said plunger has spring means resiliently biasing the same in a direction to oppose movement to said pressure voiding position.

24. In a sound attenuation device, a tubular muffler structure comprising a tubular shell having an opening through which gas may pass outwardly, and a pressure relief unit within said shell to safeguard said device against excessive pressure, said unit comprising a cylinder member in the shell, a differential pressure plunger in said cylinder member having axially spaced flanges in sliding engagement with the wall of said cylinder member, said wall having an opening communicating the space between said flanges with the space outwardly of said member and within said shell, means providing a surface sealingly engaged by one of said flanges in one position of said plunger, with a differential pressure recess between said one flange and surface, said one flange having an aperture of small size communicating said recess with said space between said flanges, said unit having a further opening exposed to said space within the innermost shell in another position of the plunger to void excess pressure from said last named space through said further opening.

25. In a sound attenuation device, a tubular muffler structure comprising a tubular shell having an opening through which gas may pass outwardly, and a pressure relief unit within said shell to safeguard said device against excessive pressure, said unit comprising a cylinder member in the shell, a differential pressure plunger in said cylinder member having axially spaced flanges in sliding engagement with the wall of said cylinder member, said wall having an opening communicating the space between said flanges with the space outwardly of said member and within said shell, means providing a surface sealingly engaged by one of said flanges in one position of said plunger, with a differential pressure recess between said one flange and surface, said one flange having an aperture of small size communicating said recess with said space between said flanges, and resiliently biased means acting on said plunger to releasably hold the same in said one position thereof, said unit having a further opening exposed to said space within the innermost shell in another position of the plunger to void excess pressure from said last named space through said further opening.

26. In a sound attenuation device, a tubular muffler structure comprising a pair of apertured, axially telescoped and radially spaced tubular shells defining an axially extending gas flow passage therebetween, at least the innermost of said shells having an opening through which gas may pass outwardly of said innermost shell to said flow passage, and a pressure relief unit within said innermost shell to safeguard said device against excessive pressure, said unit comprising a cylinder member in the last named shell, a differential pressure plunger in said cylinder member having axially spaced flanges in sliding engagement with the wall of said cylinder member, said wall having an opening communicating the space between said flanges with the space outwardly of said member and within said innermost shell, means providing a surface sealingly engaged by one of said flanges in one position of said plunger, with a differential pressure recess between said one flange and surface, said one flange having an aperture of small size communicating said recess with said space between said flanges, said unit having a further opening exposed to said space within the innermost shell in another position of the plunger to void excess pressure from said last named space through said further opening 27. In a sound attenuation device, a tubular muffler structure comprising a pair of apertured, axially telescoped and radially spaced tubular shells defining an axially extending gas flow passage therebetween, at least the innermost of said shells having an opening through which gas may pass outwardly of said innermost shell to said flow passage, and a pressure relief unit within said innermost shell to safeguard said device against excessive pressure, said unit comprising a cylinder member in the last named shell, a differential pressure plunger in said cylinder member having axially spaced flanges in sliding engagement with the wall of said cylinder member, said wall having an opening communicating the space between said flanges with the space outwardly of said member and within said innermost shell, means providing a surface sealingly engaged by one of said flanges in one position of said plunger, with a differential pressure recess between said one flange and surface, said one flange having an aperture of small size communicating said recess with said space between said flanges, and resiliently biased means acting on said plunger to releasably hold the same in said one position thereof, said unit having a further opening exposed to said space within the innermost shell in another position of the plunger to void excess pressure from said last named space through said further opening.

References Cited

UNITED STATES PATENTS

| | | | |
|---|---|---|---|
| 675,498 | 6/1901 | Quick | 181—55 |
| 681,522 | 8/1901 | Very | 181—55 X |
| 820,566 | 5/1906 | Gray | 181—53 X |
| 943,544 | 12/1909 | Hensley | 181—65 X |
| 1,127,250 | 2/1915 | Humm. | |
| 1,990,249 | 2/1935 | Pieron | 181—65 |
| 2,815,088 | 12/1957 | Gibel | 181—36 |
| 2,962,110 | 11/1960 | Depman. | |
| 3,036,653 | 5/1962 | Calabresi | 181—44 |
| 3,208,551 | 9/1965 | Carls | 181—53 X |

FOREIGN PATENTS

| | | |
|---|---|---|
| 3,354 | 1906 | Great Britain. |
| 295,652 | 7/1929 | Great Britain. |
| 752,641 | 7/1965 | Great Britain. |
| 932,373 | 7/1963 | Great Britain. |

RICHARD B. WILKINSON, *Primary Examiner.*

ROBERT S. WARD, JR., *Assistant Examiner.*